United States Patent [19]

Kajimoto et al.

[11] Patent Number: 4,643,934

[45] Date of Patent: Feb. 17, 1987

[54] MAGNETIC RECORDING MEDIUM

[75] Inventors: Norifumi Kajimoto, Saku; Hitoshi Azegami, Tobu, both of Japan

[73] Assignee: TDK Corporation, Tokyo, Japan

[21] Appl. No.: 698,980

[22] Filed: Feb. 7, 1985

[30] Foreign Application Priority Data

Feb. 10, 1984 [JP] Japan .................................. 59-21939

[51] Int. Cl.$^4$ .................................................. G11B 5/72
[52] U.S. Cl. .................................... 428/141; 360/134; 360/135; 360/136; 427/128; 427/131; 428/143; 428/147; 428/323; 428/329; 428/522; 428/521; 428/523; 428/493; 428/425.9; 428/480; 428/694; 428/900
[58] Field of Search .................... 428/694, 900, 425.9, 428/522, 523, 521, 480, 493, 336, 141, 143, 147, 323, 329; 427/128, 131; 360/134–136

[56] References Cited

U.S. PATENT DOCUMENTS

| | | | |
|---|---|---|---|
| 4,328,933 | 5/1982 | Steel | 428/694 |
| 4,414,270 | 11/1983 | Miyoshi | 428/694 |
| 4,419,406 | 12/1983 | Isobe | 428/900 |
| 4,452,863 | 6/1984 | Takizawa | 428/694 |
| 4,460,653 | 7/1984 | Azegami | 428/900 |
| 4,567,083 | 1/1986 | Arioka | 428/147 |

*Primary Examiner*—Ellis P. Robinson
*Attorney, Agent, or Firm*—Neuman, Williams, Anderson & Olson

[57] ABSTRACT

In a magnetic recording medium having a magnetic recording coat formed on one side of a base and a back coat on the other side, the back coat consists of a dispersion in a binder of an inorgainc pigment powder having an average particle diameter of 0.2 to 0.5 μm and a Mohs hardness of not greater than 6. The binder consists of a specific copolymer, a rubber-like binder, and a polyisocyanate ingredient. The copolymer consists of vinyl chloride, a vinyl alkyl carboxylate, a monomer copolymerizable with vinyl chloride, and a saponified vinyl alkyl carboxylate and has an OH/CH absorption ratio as determined from its infrared absorption spectrum in the range of 0.2 to 0.7.

11 Claims, No Drawings

MAGNETIC RECORDING MEDIUM

BACKGROUND OF THE INVENTION

This invention relates to a magnetic recording medium having a magnetic recording coat formed on one side of a base and a back coat on the other side.

With the spread of video tape recorders (hereinafter called VTRs) in recent years, there has been growing demand for video tapes and other magnetic recording media more compact in size and capable of uninterrupted recording or playback for longer periods of time than before. This demand has developed a tendency toward smoother and thinner media. The resulting media, however, tend to run unsmoothly, wind up irregularly, or have inadequate strength. As a countermeasure and also as a means of satisfying the general requirement for better picture quality of video tapes, back coating the rear side of the tapes is now a wide-spread practice.

However, the conventionally back-coated magnetic tapes are not always satisfactory in performance, and their problems have hitherto been pointed out as below:

(a) Drop of the color signal-to-noise ratio due to back coating.

(b) Air inclusion with consequent cinching.

(c) Undesired scraping of the back coat.

(d) Damaging of long-playing tapes on loading upon or unloading from the VTR.

With the view to remedying these drawbacks, various finely divided inorganic pigments or binders have heretofore been introduced as possible components of the back coat. Nevertheless, none of the combinations of these inorganic pigment powders and binders have successfully corrected the drawbacks. Some combinations even failed to achieve an improvement in the running properties of the tapes, the end the back coating is originally intended to attain.

Generally, the binder suited for use in forming a back coat is one which thoroughly disperses inorganic pigment particles. Inadequate dispersion would make the resulting back coat surface uneven. when the tape is wound on a reel, this unevenness will be transferred from the back coat of one layer to the magnetic coat on the next layer and so forth, reducing the S/N ratio accordingly. Also, it lowers the pigment-reinforcing effect of the binder, adversely affecting the repetitive-running durability of the tape, and causing unwanted back-coat scraping and white dusting. As will be clear to one of ordinary skill in the art, a large volume of white dust formed in this way can lead to malfunction of the VTR. Among the binders known to be capable of producing good dispersion of inorganic pigment particles are pyroxylin and vinyl chloride-vinyl acetate copolymer. Even such a binder, as a component of a back coat, cannot achieve completely thorough dispersion of the inorganic pigment powder and fails to give a back-coated magnetic recording medium which settles all the problems of the prior art.

SUMMARY OF THE INVENTION

We have concentrated our investigations on inorganic pigment powders and binders as components of back coats which would solve the foregoing problems. As a result, it has now been found that the dispersibility of an inorganic pigment powder can be improved and hence the above problems can be solved by using an inorganic pigment powder having certain properties and a specific copolymer as a binder and adjusting the hydroxyl group content in the copolymer within a specified range. The present invention is predicated upon this discovery.

Therefore, the invention has for its object to provide an excellent back-coated magnetic recording medium which not only achieves the advantageous effects inherent to the back coat but also attains a high color S/N ratio, with very scarce or little cinching, back-coat scraping, or damage of the tape during loading upon or unloading from the VTR, and with freedom from interlayer blocking when the tape is wound on a reel.

The object of the invention is realized by the following composition. The invention provides a magnetic recording medium having a magnetic recording coat formed on one side of a base and a back coat on the other side, said back coat comprising an inorganic pigment powder having certain properties and a binder wherein the powder is dispersed, said back coat using as the binder a specific copolymer, rubber-like binder, and a polyisocyanate ingredient. The specific copolymer to be used in the present invention consists of vinyl chloride, a vinyl alkyl carboxylate, a monomer copolymerizable with vinyl chloride, and a saponified vinyl alkyl carboxylate, with an OH/CH absorption ratio as determined from its infrared absorption spectrum within a range from 0.2 to 0.7.

DETAILED DESCRIPTION OF THE INVENTION

The copolymer for use in the present invention can be prepared in a variety of ways. For example, a vinyl chloride-vinyl alkyl carboxylate copolymer is saponified and the saponified copolymer is reacted with a monomer copolymerizable with vinyl chloride.

Useful vinyl alkyl carboxylates and their saponification products for the invention include vinyl acetate, vinyl propionate, vinyl Versatate, and their saponification products.

Monomers copolymerizable with vinyl chloride are maleic, fumaric, and methacrylic acids, their esters, acrylic acid, and its esters. For the saponification (typically of a vinyl chloride-vinyl alkyl carboxylate copolymer) the OH/CH absorption ratio as determined from its infrared absorption spectrum must come within a range of 0.2 to 0.7. The term OH/CH absorption ratio as used herein means the ratio of intensities of the absorption that appear at 3450 $cm^{-1}$ for OH to that at 2930 $cm^{-1}$ for CH.

The ratio of monomers that constitute the objective copolymer desirably is 50 to 90% by weight of vinyl chloride, 5 to 40% by weight of a vinyl alkyl carboxylate, 1.5 to 5.0% by weight of another monomer copolymerizable with vinyl chloride, and the remainder of a saponified vinyl alkyl carboxylate. The saponified monomer is essential for the improvement of separability but its overuse is not desirable because it causes the tape to run instably at high temperature and humidity (e.g., at a temperature above 40° C. and at a humidity of 80%).

The rubber-like binder to be used in this invention preferably is a polyurethane resin, polyester resin, or their combination.

Examples of the polyurethane resins that may be employed are, all in trade designations: "Nippollan 2304", "-2301", "-3022", "-5032", "-5033", and "Paraprene 22S" manufactured by Nippon Polyurethane Industry Co.; "Estane 5702", "-5703", "-5711", "-5712", and "-5717" by B. F. Goodrich Chemical Co. of the United States; "Crisvon 4216", "-4407", and "-7209" by Dainippon Ink & Chemicals, Inc.; "EA-254", "-255", "-256", "Praccel 205", "-208", "-212", "-230", "-240", "-303", "-305", "-308", "-320", and "-330" by Daicel Chemical Industries, Ltd.; "T-1040" and "E-550" by Takeda Chemical Industries, Ltd.; and "Pandex T-5000", "-T-5009", "-T-5010", "-T-5102", "-T-5205", and "-5260HT" by Dainippon Ink & Chemicals, Inc. The amount of such a polyurethane resin to be used ranges from 80 to 10%, preferably from 60 to 20%, by weight on the basis of the total resin weight in the binder.

The polyester resin as useful as the urethane resin for the present invention is, for example, one manufactured by Bayer under the trade designation "Desmophen 2200", "-1700", "-1100", "-800", or "-650", or Nippon Polyurethane Industry's "Nippollan 1004" or "-4032", or Toyobo Co.'s "Vylon 200", "-300", or "-500". The amount of such a polyester resin to be employed may be generally the same as that of a polyurethane resin.

As a further alternative, a polyester resin and a polyurethane resin may be used as a mixture. The amount of the mixture may also be approximately the same as that of the polyurethane alone.

A polyisocyanate reacts with the OH and active hydrogen groups in the copolymer and also reacts for crosslinking with the active hydrogen groups of the polyurethane or/and polyester to harden and thereupon reinforce the magnetic coat. The polyisocyanate amount to be used in the present invention is 5 to 30%, preferably 10 to 25%, by weight on the basis of the total resin weight. Commercially available polyisocyanate compounds that may be employed for this purpose include those produced by Nippon Polyurethane Industry Co., under the trade names "Coronate L", "-HL", and "-2036".

The inorganic pigment powder to be added as a filler should not have a too large average particle diameter. Oversized particles would roughen the back-coat surface so that, when the magnetic tape is wound on a reel, the unevenness of the back coat on a layer will be transferred to the magnetic coat on the next layer and so forth to lessen the S/N ratio of the medium. Conversely if the average particle diameter is too small, the beneficial effects of the back coat are reduced and cinching occurs instably while friction increases, causing damage to the tape as it is loaded upon or unloaded from the VTR. A suitable size for the inorganic pigment powder is within the average particle diameter range from 0.2 to 0.5 μm. If the inorganic pigment powder is too hard, there will be no back-coat scraping or development of white dust, but repeated runs of the tape cause the back coat to scrape the guides and other parts of the VTR and the video cassette holding the tape. The hardness of the inorganic pigment powder is desired to be not greater than 6 on Mohs scale.

A suitable inorganic pigment for use in the invention is calcium carbonate, titanium oxide or the like having a Mohs hardness of the order of 3.

Calcium carbonate of the particle size within the range specified above is filled in a binder and mixed at a ratio of 4:1 to 1:1 (by weight). A coating material thus obtained for back-coating use is applied to the rear side of a base to form a back coat having a film thickness of 0.3 to 1.5 μm and a surface roughness, Rz, of 0.1 to 0.5 μm. The coating is then dried.

In order to reduce the friction of the back coat with respect to other surfaces and to improve the running quality of the tape, a fatty acid having 12 to 20 carbon atoms, or an ester of the fatty acid and a monohydric alcohol having 3 to 12 carbon atoms, or a mixture of the both may be added as a lubricant.

The magnetic recording medium thus back-coated in accordance with the invention has a high color S/N ratio and is free from cinching or back-coat scraping. Formed into a magnetic tape, the medium will not be damaged at the time of loading or unloading, and no blocking takes place between the layers when the tape is wound on a reel.

The invention is illustrated by the following examples and comparative examples. The six properties mentioned immediately above were determined or evaluated as follows:

1. Video color S/N ratio

With an ordinary VTR of the VHS system purchased on the market, color video signals 100% modulated to 50% white level signals were recorded on each test tape in cassette. The ratio of signals and noises contained in the demodulated video signals during playback was determined by means of a video noise meter, Model "925C", manufactured by Shibasoku Co., with a TDK standard tape set to zero decibel for comparative measurement.

2. Cinching

Using a commercially available VTR of the VHS system, the total length of each test tape was driven fast forward and fast backward, stopped 50 meters short of the end point, and then again driven fast backward to the last. After the complete forward-backward run, the condition of the tape wound back was visually observed. Each test tape wound tight and satisfactorily without any gap between layers was marked "O", and any tape with an interlayer gap or gaps was marked "X".

3. Back-coat scraping

Each tape was allowed to pass 200 times through a commercially available VHS type VTR at a temperature of 40° C. and a relative humidity of 80%. Following this, the interior of the cassette housing was inspected for dirtiness. When it was fairly dirty, the mark was "X", when slightly dirty, "Δ", and when clear, "O".

4. Loading-unloading damage

The total length of each test tape was driven fast forward and then shifted fast backward on a commercially available VHS system VTR. It was stopped 50 meters short of the end point, and forward run-and-stop was repeated 10 times at intervals of 30 seconds. The tape was thereafter visually inspected for its loading-unloading damage. A tape damaged over one-third of the width was marked "X", over one-fifth of the width, "Δ", or less than that, "O".

5. Scraping of guides

Each tape was driven for 200 passages through a commercially available VHS system VTR under environments of 40° C. and 80%RH, and the guides inside the cassette housing were inspected. When the tape had scraped any guide, it was marked "X", and when not, "O".

6. Blocking of magnetic and back coats

Each tape was wound on a reel of the VHS system, allowed to stand at 60° C. for 5 days, and then was visually inspected for any blocking. When there was no blocking, the tape was evaluated with "No" and when there was, "Yes".

EXAMPLES 1 TO 6 AND COMPARATIVE EXAMPLES 1 TO 11

(A) Forming a magnetic recording coat
A composition consisting of

| | |
|---|---|
| Co-coated iron oxide | 78% |
| nitrocellulose | 5 |
| vinyl chloride-vinyl acetate copolymer | 4 |
| polyurethane | 9 |
| fatty acid | 0.5 |
| isocyanate compound | 3.5 |
| methyl ethyl ketone | 180 | was kneaded and dispersed in a ball mill, and the mixture was applied on a polyethylene terephthalate film 11.5 μm thick to form thereon a 3.5 μm-thick coat for magnetic recording. The coated film was wound into a roll for use as the base for evaluation of test back coats to be formed.

(B) Forming back coats
Each of the compositions shown in Table 1 was thoroughly kneaded and dispersed in a ball mill, and the mixture was applied on the rear side of the base prepared as above to form a coat 10 μm thick thereon, which was then heat-treated. In this manner samples of Examples 1 to 6 and Comparative Examples 1 through 11 were made. In Table 1 the quantities of the components are all by weight per 100 g of the inorganic pigment.

Each back-coated base was then slitted into tapes ½ in. wide, and each tape was set in a video cassette of the VHS system and was tested for its color S/N ratio, cinching, backcoat scraping, loading or unloading damage, guide scraping, and for blocking. The results are given in Table 2. Throughout Tables 1 and 2, Examples 1 to 6 represent the samples made in accordance with the present invention, and Comparative Examples 1 to 11, the samples for comparison. As can be seen from Table 2, the samples of Examples 1 to 6 are superior to those of Comparative Examples 1 to 11 in color S/N ratio, cinching, back-coat scraping, loading or unloading damage, and blocking of the back coat to the magnetic coat. Thus, the former samples may be said to be balanced back-coat compositions.

TABLE 1

| | Binder | | | | | | Inorganic pigment powder | | | | Lubricant | Solvent |
|---|---|---|---|---|---|---|---|---|---|---|---|---|
| | Vinyl chloride-vinyl acetate copolymer | | | Qty of nitro-cellulose added | Qty of urethane (#5033) added | Qty of polyiso-cyanate added | | Part. dia. (μm) | Mohs hard-ness | Qty added | Qty myristyric acid added | MEK/ MIBK/ TOLOL 2/1/1 |
| Sample | OH/CH abs. rat. | Monomer maleic | Qty a. added | | | | Kind | | | | | |
| Example | | | | | | | | | | | | |
| 1 | 0.2 | 1% | 22.5 g | — | 22.5 g | 5 g | Calcium carbonate | 0.2 | 3 | 100 g | 2.5 g | 600 g |
| 2 | 0.7 | " | " | — | " | " | Calcium carbonate | " | " | " | " | " |
| 3 | 0.2 | 5% | " | — | " | " | Calcium carbonate | " | " | " | " | " |
| 4 | " | 1% | " | — | " | " | Calcium carbonate | 0.5 | " | " | " | " |
| 5 | " | " | " | — | " | " | Titanium oxide | 0.2 | 5.5-6.0 | " | " | " |
| 6 | " | " | " | — | " | " | Titanium oxide | 0.5 | " | " | " | " |
| Comparative Example | | | | | | | | | | | | |
| 1 | — | — | " | — | " | " | Calcium carbonate | 0.2 | 3 | " | " | " |
| 2 | 0.8 | — | " | — | " | " | Calcium carbonate | " | " | " | " | " |
| 3 | 0.1 | 1% | " | — | " | " | Calcium carbonate | " | " | " | " | " |
| 4 | — | — | — | 22.5 g | " | " | Calcium carbonate | " | " | " | " | " |
| 5 | 0.2 | 1% | 45 g | — | — | " | Calcium carbonate | " | " | " | " | " |
| 6 | — | — | — | — | 45 g | " | Calcium carbonate | " | " | " | " | " |
| 7 | 0.2 | 1% | 25 g | — | 25 g | — | Calcium carbonate | " | " | " | " | " |
| 8 | " | " | 22.5 g | — | 22.5 g | 5 g | Calcium carbonate | 0.1 | " | " | " | " |
| 9 | " | " | " | — | " | " | Calcium carbonate | 1.0 | " | " | " | " |
| 10 | " | " | " | — | " | " | Iron oxide | 0.2 | 6.5-7.0 | " | " | " |
| 11 | " | " | " | — | " | " | Calcium carbonate | " | 3 | " | — | " |

MEK = Methyl ethyl ketone;
MIBK = Methyl isobutyl ketone;
TOLOL = Toluene.

TABLE 2

| | Color S/N ratio | Cinching | Back-coat scraping | | Loading-unloading damage | Scraping of guides | Blocking with magnetic coat surface |
|---|---|---|---|---|---|---|---|
| Sample | | | at 20° C. | at 40° C. | | | |
| Example 1 | 1.0 | O | O | O | O | O | No |
| Example 2 | 1.2 | O | O | O | O | O | " |

TABLE 2-continued

| Sample | Color S/N ratio | Cinching | Back-coat scraping at 20° C. | Back-coat scraping at 40° C. | Loading-unloading damage | Scraping of guides | Blocking with magnetic coat surface |
|---|---|---|---|---|---|---|---|
| Example 3 | 1.3 | O | O | O | O | O | '' |
| Example 4 | 0.9 | O | O | O | O | O | '' |
| Example 5 | 1.2 | O | O | O | O | O | '' |
| Example 6 | 0.9 | O | O | O | O | O | '' |
| Comp. Ex. 1 | 0.0* | O | O | O | O | O | '' |
| Comp. Ex. 2 | 1.0 | O | O | X* | O | O | '' |
| Comp. Ex. 3 | 0.3* | O | O | O | O | O | '' |
| Comp. Ex. 4 | 0.0* | O | O | O | O | O | '' |
| Comp. Ex. 5 | 1.3 | O | Δ* | Δ* | Δ* | O | '' |
| Comp. Ex. 6 | −1.5* | O | Δ* | X* | O | O | Yes* |
| Comp. Ex. 7 | 1.0 | O | X* | X* | Δ* | O | No |
| Comp. Ex. 8 | 1.1 | Δ* | O | O | Δ* | O | '' |
| Comp. Ex. 9 | −1.0* | O | O | O | O | O | '' |
| Comp. Ex. 10 | 1.0 | O | O | O | O | X* | '' |
| Comp. Ex. 11 | 1.0 | O | O | Δ* | Δ* | O | '' |

*Questionable or undesirable.

What is claimed is:

1. An improved back-coated magnetic recording medium which attains a desirably high video color S/N ratio and has a substantially even and uniform back coat, which comprises:
a non-magnetic base,
a magnetic recording coat formed on one side of the base, and
a back coat formed on the other side of the base;
said back coat being a substantially even and uniform coat formed of a substantially thorough or uniform dispersion of inorganic pigment particles in the form of a powder in a resinous binder, and providing improved running or operational properties to the magnetic recording medium and allowing the attainment of a desirably high video color S/N ratio and substantial freedom from cinching, back coat scraping, loading-unloading damage, and blocking of the back coat to the magnetic coat;
said inorganic pigment powder having an average particle diameter in the range of about 0.2 μm to about 0.5 μm and a particle hardness of not greater than about 6 on the Mohs scale;
said resinous binder being formed of a copolymer component, a rubbery binder component, and a polyisocyanate crosslinking component;
said copolymer component being formed of vinyl chloride, vinyl alkyl carboxylate, another monomer copolymerizable with vinyl chloride, and saponified vinyl alkyl carboxylate having an OH/CH absorption ratio in the range of about 0.2 to about 0.7 as determined from its infrared absorption spectrum.

2. A magnetic recording medium according to claim 1 wherein said inorganic pigment powder includes a member selected from the group consisting of finely-divided calcium carbonate and titanium oxide.

3. A magnetic recording medium according to claim 1 wherein said rubbery binder component is at least one member selected from the group consisting of polyester resins, polyurethane resins, and admixtures thereof.

4. A magnetic recording medium according to claim 1 wherein said inorganic pigment powder includes a member selected from the group consisting of finely-divided calcium carbonate and titanium oxide, and said rubbery binder component is at least one member selected from the group consisting of polyester resins, polyurethane resins, and admixtures thereof.

5. A magnetic recording medium according to claim 1 wherein said copolymer component is formed, on a weight basis, of about 50 to 90% of vinyl chloride, about 5 to 40% of vinyl alkyl carboxylate, about 1.5 to 5% of another monomer compolymerizable with vinyl chloride, and the remainder of said copolymer component is saponified vinyl alkyl carboxylate having an OH/CH absorption ratio in the range of about 0.2 to about 0.7 as determined from its infrared absorption spectrum.

6. A magnetic recording medium according to claim 1 wherein said inorganic pigment powder includes a member selected from the group consisting of finely-divided calcium carbonate and titanium oxide, and said copolymer component is formed, on a weight basis, of about 50 to 90% of vinyl chloride, about 5 to 40% of vinyl alkyl carboxylate, about 1.5 to 5% of another monomer copolymerizable with vinyl chloride, and the remainder of said copolymer component is saponified vinyl alkyl carboxylate with an OH/CH absorption ratio in the range of about 0.2 to about 0.7 as determined from its infrared absorption spectrum.

7. An improved back-coated magnetic recording medium which attains a desirably high video color S/N ratio and has a substantially even and uniform back coat, which comprises:
a non-magnetic base,
a magnetic recording coat formed on one side of the base, and
a back coat formed on the other side of the base;
said back coat being a substantially even and uniform coat formed of a substantially thorough or uniform dispersion of inorganic pigment particles in the form of a powder in a resinous binder, and providing improved running or operational properties to the magnetic recording medium and allowing the attainment of a desirably high video color S/N ratio and substantial freedom from cinching, back coat scraping, loading-unloading damage, and blocking of the back coat to the magnetic coat;
said inorganic pigment powder includes a member from the group consisting of finely-divided calcium carbonate and titanium oxide, and has an average particle diameter in the range of about 0.2 μm to about 0.5 μm and a particle hardness of not greater than about 6 on the Mohs scale;
said resinous binder being formed of a copolymer component, a rubbery binder component, and a polyisocyanate crosslinking component;

said copolymer component being formed, on a weight basis, of about 50 to 90% of vinyl chloride, about 5 to 40% of vinyl alkyl carboxylate, about 1.5 to 5% of another monomer copolymerizable with vinyl chloride, and the remainder of said copolymer component is saponified vinyl alkyl carboxylate having an OH/CH absorption ratio in the range of about 0.2 to about 0.7 as determined from its infrared absorption spectrum;

said rubbery binder component being formed of at least one member selected from the group consisting of polyester resins, polyurethane resins, and admixtures thereof.

8. A magnetic recording medium according to claim 7 wherein the back coat, as applied to the base, has a film thickness of about 0.3 to about 1.5 $\mu$m and a surface roughness, Rz, of about 0.1 to about 0.5 $\mu$m.

9. A magnetic recording medium according to claim 7 wherein the substantially thorough or uniform dispersion of inorganic pigment and resinous binder is present in the back coat in a weight ratio of about 4:1 to about 1:1.

10. A magnetic recording medium according to claim 9 wherein the back coat, as applied to the base, has a film thickness of about 0.3 to about 1.5 $\mu$m and a surface roughness, Rz, of about 0.1 to about 0.5 $\mu$m.

11. A magnetic recording medium according to claim 7 wherein the back coat has a friction-reducing lubricant.

* * * * *